(12) United States Patent
Sundberg et al.

(10) Patent No.: US 9,179,347 B2
(45) Date of Patent: Nov. 3, 2015

(54) DEVICE AND METHOD FOR EXTENDED PTCCH SPACE

(75) Inventors: Mårten Sundberg, Arsta (SE); Paul Schliwa-Bertling, Ljungsbro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 452 days.

(21) Appl. No.: 13/519,338

(22) PCT Filed: May 7, 2012

(86) PCT No.: PCT/SE2012/050476
§ 371 (c)(1),
(2), (4) Date: Jun. 27, 2012

(87) PCT Pub. No.: WO2012/154114
PCT Pub. Date: Nov. 15, 2012

(65) Prior Publication Data
US 2013/0070736 A1 Mar. 21, 2013

Related U.S. Application Data

(60) Provisional application No. 61/483,908, filed on May 9, 2011.

(51) Int. Cl.
*H04B 7/26* (2006.01)
*H04W 24/10* (2009.01)
(Continued)

(52) U.S. Cl.
CPC ............ *H04W 24/10* (2013.01); *H04B 7/2656* (2013.01); *H04W 72/0446* (2013.01); *H04W 48/16* (2013.01)

(58) Field of Classification Search
CPC ..... H04W 24/10; H04W 48/10; H04W 48/16; H04W 74/006; H04B 7/2656; H04B 7/2659
USPC ................. 370/329–337, 345, 347, 442, 498
See application file for complete search history.

(56) References Cited

U.S. PATENT DOCUMENTS

| 7,054,285 B2 | 5/2006 | Molno et al. | |
|---|---|---|---|
| 2004/0120302 A1* | 6/2004 | Sebire et al. | 370/347 |
| 2012/0051303 A1* | 3/2012 | Dhanda et al. | 370/329 |

OTHER PUBLICATIONS

3GPP TS 05.02 V8.11.0, 3$^{rd}$ Generation Partnership Project; Technical Specification Group GSM/EDGE Radio Access Network; Multiplexing and multiple access on the radio path (Release 1999); Jun. 2003, pp. 1-77.

(Continued)

*Primary Examiner* — Pao Sinkantarakorn
(74) *Attorney, Agent, or Firm* — Patent Portfolio Builders, PLLC

(57) ABSTRACT

An MS, for a GSM/EDGE network, arranged to, as a first alternative, use every 13$^{th}$ TDMA frame with an odd number as an idle frame which is used for neighboring cell measurements and every 13$^{th}$ TDMA frame with an even number as a PTCCH, a Packet Timing Control Channel. The MS is arranged to, as a second alternative, use every 13$^{th}$ TDMA frame with an odd number as a PTCCH and every 13$^{th}$ TDMA frame with an even number for neighboring cell measurements. The MS is arranged to transmit information to the network that the MS supports the use of the second alternative, and to receive information from the network about which of these two alternatives that the MS should use.

39 Claims, 9 Drawing Sheets

| Channel | Sub-channel | Direction | Repeat length, TDMA frames | Interleaved block TDMA frame |
|---|---|---|---|---|
| PTCCH/D | 0-15<br>0-15<br>0-15<br>0-15 | DL | 416 | B0(12,38,64,90)<br>B1(116, 142,168,194)<br>B2(220, 246, 272, 298)<br>B3(324, 350, 376, 402) |
| ePTCCH/D | 0-15<br>0-15<br>0-15<br>0-15 | DL | 416 | B0(25,51,77,103)<br>B1(129,155,181,207)<br>B2(233,259,285,311)<br>B3(337,363,389,415) |
| PTCCH/U | 0<br>1<br>..<br>15 | UL | 416 | B0(12)<br>B0(38)<br>.......<br>B0(402) |
| ePTCCH/U | 0<br>1<br>..<br>15 | UL | 416 | B0(25)<br>B0(51)<br>.......<br>B0(415) |

(51) Int. Cl.
*H04W 72/04* (2009.01)
*H04W 48/16* (2009.01)

(56) References Cited

OTHER PUBLICATIONS

3GPP TS 45.010 V10.1.0, 3rd Generation Partnership Project; Technical Specification Group GSM/EDGE Radio Access Network; Radio subsystem synchronization (Release 10); Mar. 2011, pp. 1-32.
3GPP TS 44.060 V8.12.1, 3rd Generation Partnership Project; Technical Specification Group GSM/EDGE Radio Access Network: General Packet Radio Service (GPRS); Mobile station (MS)—Base Station System (BSS) interface; Radio Link Control/Medium Access Control (RLC/MAC) protocol (Release 8); Mar. 2011, pp. 1-589.
International Search Report and Written Opinion Corresponding to International Application No. PCT/SE2012/050476; Date of Mailing: Sep. 10, 2012; 12 Pages.
3GPP TS 43.064 V10.0.0, 3rd Generation Partnership Project; Technical Specification Group GSM/EDGE Radio Access Network; General Packet Radio Service (GPRS); Overall description of the GPRS radio interface; Stage 2 (Release 10); Sep. 2010, pp. 1-105.
3GPP TS 45.002 V7.8.0, 3rd Generation Partnership Project; Technical Specification Group GSM/EDGE Radio Access Network; Multiplexing and multiple access on the radio path (Release 7); Mar. 2011, pp. 1-105.

\* cited by examiner

| Channel | Sub-channel | Direction | Repeat length, TDMA frames | Interleaved block TDMA frame |
|---|---|---|---|---|
| PTCCH/DL | 0-15<br>0-15<br>0-15<br>0-15 | DL | 416 | B0(12,38,64,90)<br>B1(116, 142,168,194)<br>B2(220, 246, 272, 298)<br>B3(324, 350, 376, 402) |
| PTCCH/UL | 0<br>1<br>2<br>3<br>4<br>5<br>6<br>7<br>8<br>9<br>10<br>11<br>12<br>13<br>14<br>15 | UL | 416 | B0(12)<br>B0(38)<br>B0(64)<br>B0(90)<br>B0(116)<br>B0(142)<br>B0(168)<br>B0(194)<br>B0(220)<br>B0(246)<br>B0(272)<br>B0(298)<br>B0(324)<br>B0(350)<br>B0(376)<br>B0(402) |

Fig. 2    PRIOR ART

| Channel | Sub-channel | Direction | Repeat length, TDMA frames | Interleaved block TDMA frame |
|---|---|---|---|---|
| PTCCH/D | 0-15<br>0-15<br>0-15<br>0-15 | DL | 416 | B0(12,38,64,90)<br>B1(116, 142,168,194)<br>B2(220, 246, 272, 298)<br>B3(324, 350, 376, 402) |
| ePTCCH/D | 0-15<br>0-15<br>0-15<br>0-15 | DL | 416 | B0(25,51,77,103)<br>B1(129,155,181,207)<br>B2(233,259,285,311)<br>B3(337,363,389,415) |
| PTCCH/U | 0<br>1<br>:<br>15 | UL | 416 | B0(12)<br>B0(38)<br>......<br>B0(402) |
| ePTCCH/U | 0<br>1<br>:<br>15 | UL | 416 | B0(25)<br>B0(51)<br>......<br>B0(415) |

Fig. 3

DEVICE AND METHOD FOR EXTENDED PTCCH SPACE

CROSS-REFERENCE TO RELATED APPLICATION

This application is a 35 U.S.C. §371 national stage application of PCT International Application No. PCT/SE2012/050476, filed on May 7, 2012, which claims priority to U.S. Provisional Application No. 61/483,908, filed on May 9, 2011. The disclosures of both of the above referenced applications are hereby incorporated herein in their entireties by reference.

TECHNICAL FIELD

The present invention discloses a device and a method for extended PTCCH space in a GSM/EDGE network.

BACKGROUND

In GSM networks which are enabled for EDGE, so called GSM/EDGE networks, there is always a need to improve the utilization of the network's radio resources. One of the reasons for this is the introduction of so called "smart phones" which are designed to perform a large number of applications which use autonomous access triggers for communication with the application servers. Another reason for the need to improve the utilization of the network's radio resources is the increasing use of so called Machine Type Communication devices, usually referred to as MTC devices.

In a GSM/EDGE network, so called "timing advance" is used for the devices in the network, here referred to generically as Mobile Stations, MSs, with an ongoing RLC/MAC connection in order to align the MSs' transmit time with the receive window in the base stations. The timing advance is estimated by the network and signaled to the MSs via the channel known as the PTCCH channel, the Packet Timing Control Channel. For each MS, a specific PTCCH sub channel is allotted, i.e. one MS—one PTCCH sub channel.

In a GSM/EDGE network, the network does not know whether or not more data will be transmitted from an MS, which means that the network does not know exactly when to disconnect a specific RLC/MAC connection, as a result of which the network usually prolongs the RLC/MAC connections in order to avoid renewed costly access procedures over the Common Control Channel, the CCCH. This, however, results in an increased consumption of PTCCH sub channels, which must be seen against the fact that at present, the number of PTCCH sub channels that can be used simultaneously is 16 per time slot. At present, every $13^{th}$ TDMA frame in a 52-multiframe with an even frame number is used for a timing advance procedure, by means of the MSs transmitting bursts for timing advance measurements in the uplink and receiving timing advance messages from the network in the downlink, while every $13^{th}$ TDMA frame in a 52-multiframe with an odd number is called an Idle frame and is used by the MSs for neighboring cell measurements. The term "every $13^{th}$ TDMA frame" is here used to refer to a system in which frame "number zero", i.e. the first TDMA frame in a 52-multiframe, is used as the starting point for the counting of "every 13th TDMA frame".

SUMMARY

It is an object of the invention to obviate at least some of the disadvantages mentioned above, and to provide an increased number of PTCCH sub channels.

This object is achieved by means of a Mobile Station, an MS, for a GSM/EDGE network. The MS is arranged to, as a first alternative, use every $13^{th}$ TDMA frame with an odd number as an idle frame which is used for neighboring cell measurements and every $13^{th}$ TDMA frame with an even number as a PTCCH, a Packet Timing Control Channel.

The MS is arranged to, as a second alternative, use every $13^{th}$ TDMA frame with an odd number as a PTCCH and every $13^{th}$ TDMA frame with an even number for neighboring cell measurements. The MS is also arranged to transmit information to the network that the MS supports the use of this second alternative, and to receive information from the network about which of these two alternatives that the MS should use.

Thus, by means of the invention, the number of TDMA frames available for the PTCCH in the network is in effect doubled, thereby, as will be explained below, also doubling the number of available PTCCH sub channels.

In embodiments, the MS is arranged to transmit the information that the MS supports the use of the second alternative to the network in the Information Element MS Radio Access Capability.

In embodiments, the MS is arranged to transmit said information to the network in an access burst, if the MS receives information in the system information that the second alternative is supported by the network.

In embodiments, the MS is arranged to transmit said information to the network as a code point in the EGPRS (Enhanced GPRS) packet Channel Request.

In embodiments, the MS is arranged to transmit said information to the network as a training sequence to be used when transmitting an access request message.

The object of the invention is also achieved by means of a Base Station Controller, a BSC, for a GSM/EDGE network. The BSC is arranged to instruct a Mobile Station, an MS, in the system, to use every $13^{th}$ TDMA frame with an odd number as an idle frame for neighboring cell measurements and every $13^{th}$ TDMA frame with an even number as a PTCCH, a Packet Timing Control Channel, or, as an alternative, if the BSC receives information that the MS supports this alternative, to instruct the MS to use every $13^{th}$ TDMA frame with an odd number as a PTCCH and every $13^{th}$ TDMA frame with an even number for neighboring cell measurements.

In embodiments, the BSC is arranged to receive the information regarding the MS's support for said alternative in the Information Element MS Radio Access Capability from the MS.

In embodiments, the BSC is arranged to receive the information regarding the MS's support for said alternative via an access burst.

In embodiments, the BSC is arranged to receive the information regarding the MS's support for said alternative as a code point in the EGPRS packet Channel Request.

In embodiments, the BSC is arranged to receive the information regarding the MS's support for said alternative via a training sequence when the MS transmits an access request message.

In embodiments, the BSC is arranged to receive the information regarding the MS's support for said alternative from an SGSN in the GSM/EDGE network.

The object of the invention is also addressed by means of a method for operating a Mobile Station, an MS, in a GSM/EDGE network. The method comprises arranging the MS to use, as a first alternative, every $13^{th}$ TDMA frame with an odd number as an idle frame for neighboring cell measurements and every $13^{th}$ TDMA frame with an even number as a PTCCH, a Packet Timing Control Channel, and, as a second alternative, to use every $13^{th}$ TDMA frame with an odd number as a PTCCH and every 13$^{th}$ TDMA frame with an even number for neighboring cell measurements.

The method further comprises transmitting information to the GSM/EDGE network that the MS is able to use said second alternative, and to receive instructions from the GSM/EDGE network regarding which of the first and second alternatives that the MS should use.

In one embodiment, the information is transmitted to the GSM/EDGE network in the Information Element MS Radio Access Capability.

In one embodiment, the information is transmitted to the GSM/EDGE network in an access burst, if the MS receives information in the system information that the second alternative is supported by the network.

The object of the invention is also addressed by means of a method for operating a Base Station Controller, a BSC, in a GSM/EDGE network. The method comprises instructing an MS in the GSM/EDGE network to use every 13$^{th}$ TDMA frame according to a first alternative, or, alternatively, if the BSC receives or has received information that the MS supports this, instructing an MS in the GSM/EDGE network to use every 13$^{th}$ TDMA frame according to a second alternative.

The first alternative comprises using every 13$^{th}$ TDMA frame with an odd number as an idle frame for neighboring cell measurements and every 13$^{th}$ TDMA frame with an even number as a PTCCH, a Packet Timing Control Channel, the second alternative comprising using every 13$^{th}$ TDMA frame with an odd number as a PTCCH and every 13$^{th}$ TDMA frame with an even number for neighboring cell measurements.

In one embodiment according to the method, the information regarding the MS's support for said second alternative is received in the Information Element MS Radio Access Capability from the MS.

In one embodiment according to the method, the information regarding the MS's support for said second alternative is received as an access burst.

Suitably, the use of "every 13$^{th}$ TDMA frame" as mentioned above starts at the first TDMA frame in a 52-multiframe, i.e. at TDMA frame "number zero", although in principle, the starting point for the counting of "every 13$^{th}$ TDMA frame" can of course be at a more or less arbitrary frame in a 52-multiframe.

The invention also discloses a Base Transceiver Station, BTS, for a GSM/EDGE network. The BTS is arranged to detect one or more access bursts from one or more Mobile Stations, MSs, in a cell in the GSM/EDGE network, and to determine a Timing Advance, TA, value for each of the one or more MSs based on said burst or bursts. The BTS is also arranged to transmit an MS's determined TA value to the MS, and to carry out said detection and transmission for an MS in a TDMA frame which the MS uses for the PTCCH channel, with said TDMA frame either being taken, as a first alternative, from among every 13th TDMA frame with an even number or, as a second alternative, from among every 13th TDMA frame with an odd number.

In embodiments, the BTS is arranged to receive an instruction from a Base Station Controller, BSC, in the GSM/EDGE network, regarding whether the first or second alternative should be used for an MS.

In embodiments, the BTS is arranged to receive information from an MS that the MS is capable of the second alternative, and to transmit this information to the BSC.

In embodiments, the BTS is arranged to receive said information from the MS in the Information Element MS Radio Access Capability.

In embodiments, the BTS is arranged to receive said information in an access burst.

In embodiments, the BTS is arranged to receive said information from the MS as a code point in the EGPRS packet Channel Request.

In embodiments, the BTS is arranged to receive said information from the MS as a training sequence in connection with an access request message from the MS.

Also disclosed is a method for operating a Base Transceiver Station, BTS, in a GSM/EDGE network. The method comprises detecting one or more access bursts from one or more Mobile Stations, MSs, in a cell in the GSN/EDGE network and determining a Timing Advance, TA, value for each of said one or more MSs based on said one or more access bursts. The method further comprises transmitting an MS's determined TA value to the MS. According to the method, said detection and transmission for an MS is carried out in a TDMA frame which the MS uses for the PTCCH channel, and said TDMA is either taken, as a first alternative, from among every 13th TDMA frame with an even number or, as a second alternative, from among every 13th TDMA frame with an odd number.

In embodiments, the method comprises receiving an instruction from a Base Station Controller, BSC, in the GSM/EDGE network, regarding whether the first or second alternative should be used for an MS.

In embodiments, the method comprises receiving information from an MS that the MS is capable of the second alternative, and transmitting this information to the BSC.

BRIEF DESCRIPTION OF THE DRAWINGS

The invention will be described in more detail in the following, with reference to the appended drawings, in which FIG. 2 shows prior art PTCCH, and FIG. 3 shows inventive PTCCH.

DETAILED DESCRIPTION

Figure 1:
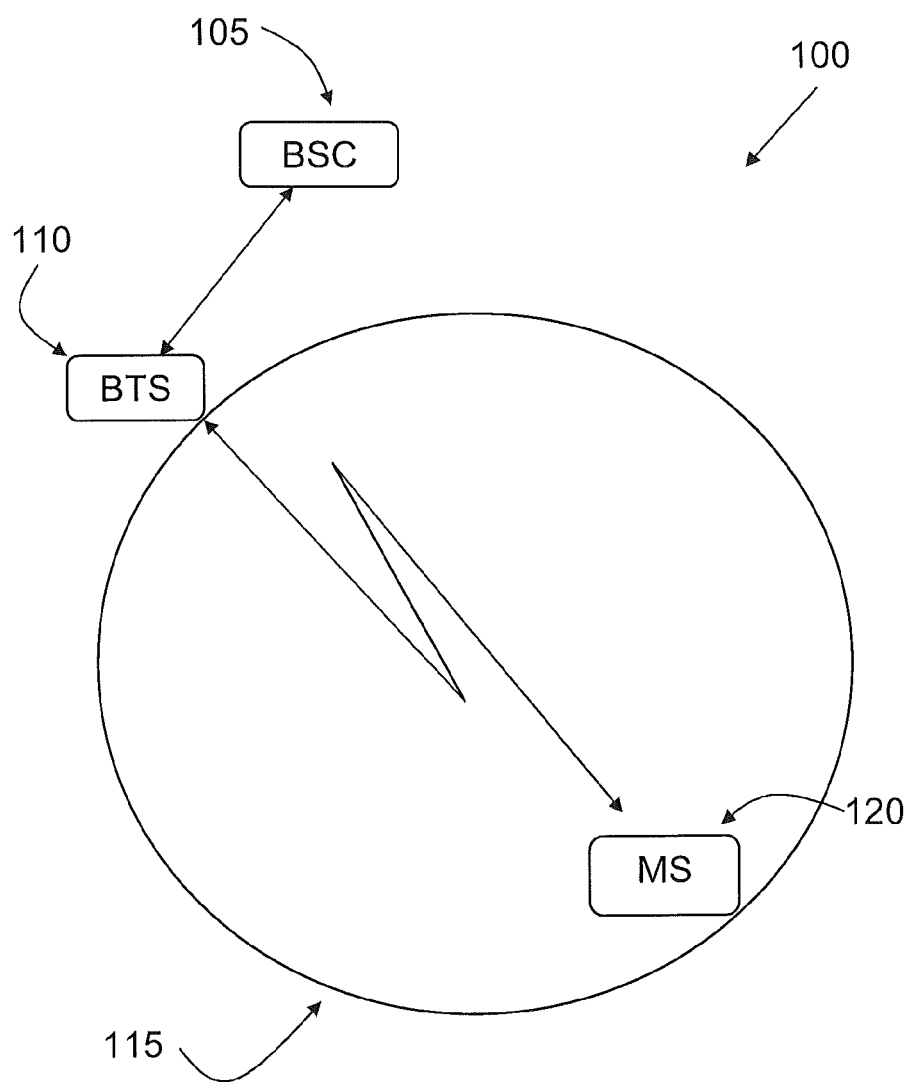
FIG. 1 shows an overview of a part of a GSM/EDGE network.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

FIG. 1 shows an overview of a part of a GSM/EDGE network 100. The GSM/EDGE network ("the network") 100 comprises a number of cells, one of which is shown in FIG. 1 with the reference number 115. Each cell such as the one 115 in the network 100 can accommodate a number of devices, here referred to as Mobile Stations, MSs, one of which is shown, by way of example, as 120. All communication to/from the MSs in the cell 115 is routed via a Base Transceiver Station 110, abbreviated as "BTS", and sometimes also referred to as a base station. The control of the MSs in the cell 115 is carried out by the BTS 110 together with a Base Station Controller 105, which also in part controls the BTS 110. One BSC can control a plurality of BTSs and/or cells. The combination of one BTS and one BSC is sometimes referred to as a cell's BSS, Base Station Subsystem.

In order for transmissions from the MSs in a cell to reach the BTS of the cell during a specified time window, each MS needs to receive information on so called timing advance, since each MS may be located at a different distance from the BTS of the cell than the other MSs in the cell. Such instructions are determined by the BTS and/or the BSC of the cell, based on measurements which are made on transmissions from each MS in a cell to the BTS. The instructions for timing advance to a specific MS in a cell are transmitted from the BSC to the BTS and from there to the MS, on the channel known as PTCCH, Packet Timing Control Channel.

In order to enhance the understanding of one aspect of the invention, the current use of PTCCH will first be briefly described with reference to the table of FIG. 2: according to a present method, each MS in a cell is assigned a so called PTCCH sub-channel for use both in the downlink, DL, and the uplink, UL, directions. Transmissions, both in DL and in UL, are made in so called blocks which are sub-sets (comprising 23 octets, i.e. 184 bits) of TDMA frames. As shown in FIG. 2, each block in the DL is transmitted in ("mapped onto") four pre-determined TDMA frames. An example of this is that in DL, as shown in FIG. 2, block 0 is transmitted in TDMA frames 1, 38, 64 and 90. FIG. 2 also shows the TDMA frames used for DL blocks 1-3.

As shown in FIG. 2, in DL, each of blocks 0-3 comprises information for each sub-channel 0-15. In UL, as shown in FIG. 2, each sub-channel 0-15 is transmitted in a specific TDMA frame in block 0.

In the DL, four blocks are transmitted per each 416 TDMA-frame period, while in the UL 16 blocks are transmitted during the same period, hence the caption in the rightmost column of FIG. 2 "Interleaved block TDMA frame", by which is meant that each block is transmitted in one or more TDMA frames.

Every $13^{th}$ TDMA frame (where the counting starts from frame number zero) in a 52-multiframe (i.e. 52 TDMA frames) on a time slot on which a PTCCH is mapped is not used for data transmission by the BTS. Of these every 13th frames, those with odd numbers are considered as idle frames which are used by the MSs in a cell for measurements of neighboring cells, and those with even numbers are used for the continuous timing advance procedure, i.e. as a PTCCH, either in downlink, DL, during which the MSs receive timing advance instructions from the BSS, or in uplink, UL, during which the MSs transmit access bursts for measurements of timing advance by the BTS.

As can be seen from the column for PTCCH/UL in FIG. 2, there is at present room for 16 PTCCH sub channels, which is due to the fact that the PTCCH is mapped onto a 416-frame multiframe (TDMA frames) and uses every even $13^{th}$ sub-frame, i.e. every $26^{th}$ frame in the 416-frame multiframe.

The invention shows an increase (up to a doubling) in the available PTCCH sub channels in, for example, a 416 frame multiframe, by means of the use of what will here be referred to as extended PTCCH, ePTCCH, defined as follows:
 allow the assignment to MSs that support ePTCCH of every $13^{th}$ odd TDMA-frame as ePTCCH for the Timing Advance procedure.
 allow MSs that support and are assigned an ePTCCH to use every $13^{th}$ even TDMA-frame for neighbor cell measurements.

Thus, by means of the invention, MSs are introduced that support the use of ePTCCH, as well as a BSS that supports the use of ePTCCH. How such MSs and the BTS/BSC of the BSS function will be described in more detail below. However, first, an overview will be given of some advantages afforded by ePTCCH.

With the use of ePTCCH, the BSS of a cell, comprised of the cell's BSC and BTS, will have the ability to assign every other $13^{th}$ TDMA-frame with an odd frame number for use as an ePTCCH sub-channel through a new set of extended Timing Advance Indexes, i.e. eTAI values. MSs that support the feature of ePTCCH will use every other even $13^{th}$ TDMA-frame for neighboring cell measurements when assigned an ePTCCH sub-channel. In addition, MSs that support ePTCCH naturally also support the legacy PTCCH, the use of which was described in conjunction with FIG. 2 above. Thus, even in a cell in which all of the MSs support ePTCCH, the BSS can configure some of the MSs in the cell to use ePTCCH and the other MSs to use "legacy" PTCCH, as an alternative to which all of the MSs can of course be configured to use ePTCCH.

FIG. 3 shows the available number of sub-channels with the use of ePTCCH. As can be seen, the number of available sub-channels has been doubled, both in uplink, UL, and in downlink, DL.

Figure 4:
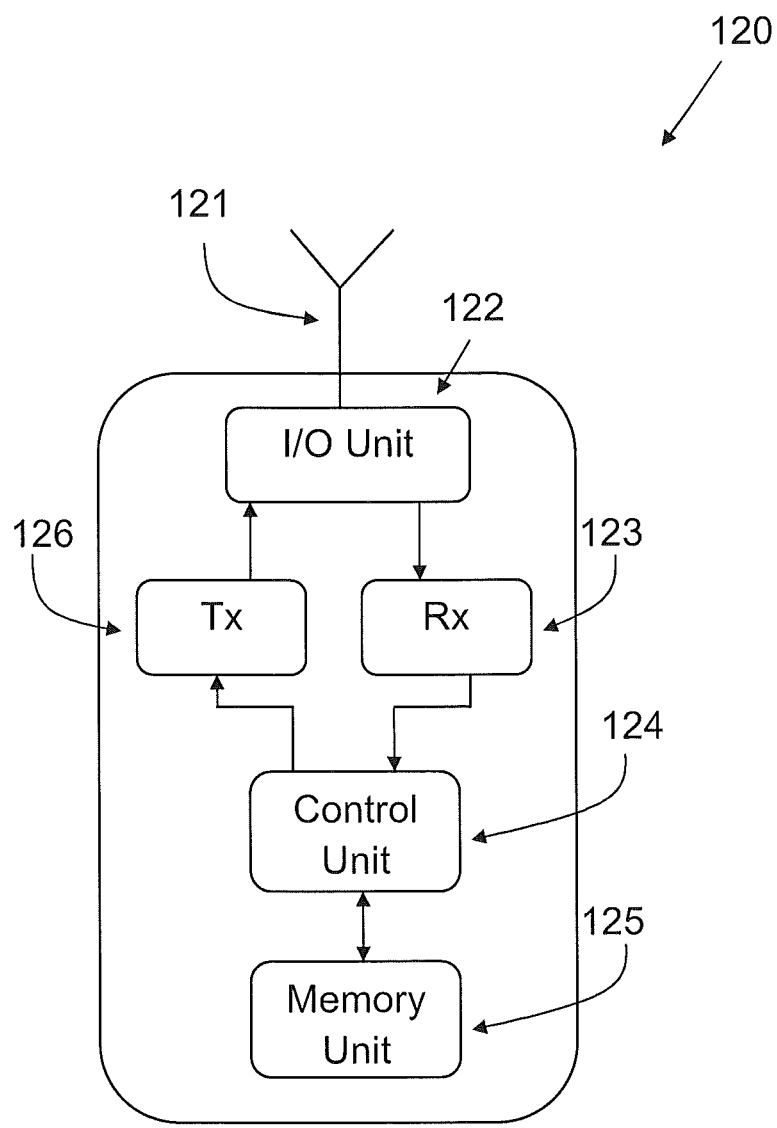
FIG. 4 shows a block diagram of a Mobile Station.

Turning now to a more detailed description of an MS capable of supporting ePTCCH, such an MS 120 will be described with reference to the block diagram which is shown in FIG. 4: the MS 120 comprises an antenna unit 121, by means of which it handles transmissions to and reception from other units in the GSM/EDGE network. In addition, the MS 120 comprises an I/O unit 122 for formatting incoming and/or outgoing transmissions. The MS 120 also comprises a transmit unit Tx 126, as well as a receive unit Rx 123, both of which are connected to the I/O-unit 120. The function of the MS 120 is controlled by a control unit 124, which is connected to both the receive unit 123 and the transmit unit 126. In addition, the MS 120 comprises a memory unit 125, which is also connected to the control unit 124.

The MS 120 is thus capable of supporting (i.e. using) ePTCCH and should be arranged to let the GSM/EDGE network know this, i.e. that the MS supports ePTCCH. This is done by means of transmitting information to this effect, as initiated by the control unit 124, and carried out by the transmit unit 126, the I/O-unit 122 and the antenna unit 121, by means of which a transmission comprising the information in question (i.e. "support for ePTCCH") is transmitted to the BSS of the cell, in this case to the BTS of the BSS, from where it may be forwarded to the BSC.

The information that the MS 120 supports ePTCCH can be transmitted to the BSS in a number of ways.

In one embodiment, the MS 120 is arranged to transmit the information to the BSS in the Information Element (IE) MS Radio Capability. In such an embodiment, one or more additional bits need to be added to the IE in question for this purpose, in addition to which, of course one of the existing bits in the IE can be "updated" to be used for this purpose.

Another way of letting the MS 120 transmit the information to the BSS is to use an access burst for this purpose, either by introducing a new access burst or by using an (amended) existing one. Such an access burst would be used by MSs such as the MS 120 when there is an indication in the system information which is broadcast by the BTS in the BCCH (Broadcast Channel) of the cell, that ePTCCH is supported by the network. The access burst could e.g. be defined as a new code point in the 3GPP 44.060 EGPRS PACKET CHANNEL REQUEST message, or, alternatively, as a (new) training sequence that the MS 120 shall use when transmitting, for example, the access request message EGPRS PACKET CHANNEL REQUEST.

When the network detects (for the case of training codes) or decodes (for the case of a code point in the EGPRS message) the access burst in question, the network will know that the access burst originates from an MS such as the MS 120 i.e. an MS that is capable of ePTCCH. The access burst could e.g. be defined as a new code point in the 3GPP 44.060 EGPRS PACKET CHANNEL REQUEST message, or, alternatively, as a (new) training sequence that the MS 120 shall use when transmitting, for example, the access request message EGPRS PACKET CHANNEL REQUEST.

The use of an access burst to transmit the information from the MS 120 to the network that the MS 120 supports ePTCCH will help the network to understand from the very first access request that the MS 120 supports ePTCCH, which is advantageous in situations in which speed is important, for example in so called One phase Access procedures.

The information that the MS 120 supports ePTCCH could also be combined with other information regarding the MS's capabilities, for example that the MS supports methods that increase addressing space of the data allocation, e.g. the USF (Uplink State Flag) and the TFI addressing space.

Regarding the various ways that have been described above for the MS 120 to transmit information to the network that the MS 120 supports ePTCCH, it should be pointed out that the MS 120 need not be restricted to only being arranged to use one of these methods; an MS that is arranged to use a combination of more than one of the methods described above is also included in the invention.

Figure 5:
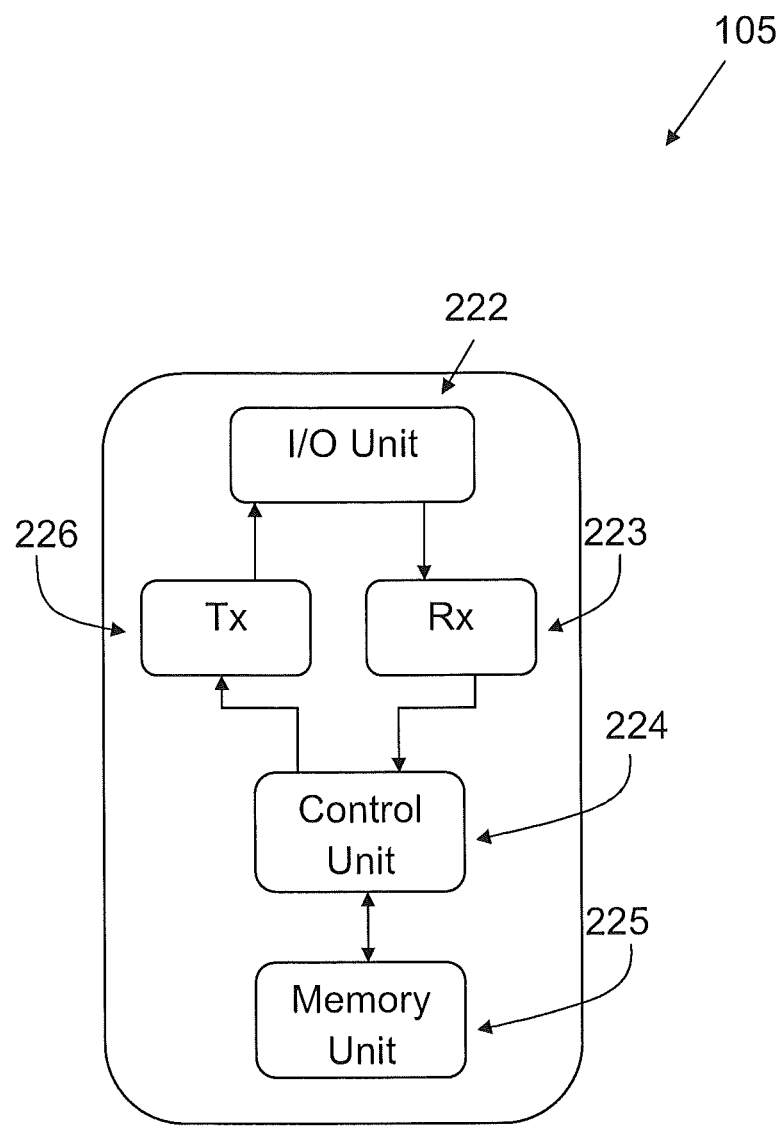
FIG. 5 shows a block diagram of a Base Station Controller.

Turning now to the BSS of the invention, a BSC such as the one 105 in FIG. 1 will now be described, with reference to the block diagram which is shown in FIG. 5: the BSC 105 comprises an I/O unit 222 by means of which it handles transmissions to and reception from other units in the GSM/EDGE network, as well as formatting of incoming and/or outgoing transmissions. The "other units" in the GSM/EDGE network include one or more BTSs, as well as "higher" nodes in the GSM/EDGE network.

The BSC 105 also comprises a transmit unit Tx 226, as well as a receive unit Rx 223, both of which are connected to the I/O-unit 220. The function of the BSC 105 is controlled by a control unit 224, which is connected to both the receive unit 223 and the transmit unit 226. In addition, the BSC 105 comprises a memory unit 225, which is also connected to the control unit 224.

The BSC 105 is arranged to instruct MSs in the cells which the BSC 105 controls to use every $13^{th}$ TDMA frame either according to the "legacy PTCCH" principle or according to the "ePTCCH principle". The term "legacy PTCCH principle" is here used to refer to the principle of using every $13^{th}$ TDMA frame with an odd number for neighboring cell measurements and every $13^{th}$ TDMA frame with an even number as a PTCCH, a Packet Timing Control Channel, and the term "ePTCCH principle" is used to refer to the principle of using every $13^{th}$ TDMA frame with an odd number as a PTCCH and every $13^{th}$ TDMA frame with an even number for neighboring cell measurements.

In order to instruct an MS to use the ePTCCH principle, the BSC 105 must first have received information to the effect that the MS in question can handle this principle. In addition, it should be pointed out that MSs that are arranged to handle the ePTCCH principle are also arranged to handle the "legacy PTCCH principle". This means, for example, that if the BSC 105 receives information that all of the MSs in a certain cell are arranged to handle the ePTCCH principle, the BSC 105 can still instruct some of them to use the legacy PTCCH principle, and the remaining MS to use the ePTCCH principle.

The BSC 105 can receive the information that a certain MS can handle the ePTCCH principle in a number of ways. In embodiments, the BSC 105 is arranged to handle one or more of these ways. In those cases where the information is received from the MS, this is done via the BTS of the MS's cell, so that the MS transmits information to the BTS of its cell, which then forwards the information to the BSC 105.

In one embodiment, the BSC 105 is arranged to receive the information regarding an MS's support for the "ePTCCH principle" in the Information Element MS Radio Access Capability from the MS.

In one embodiment, the BSC 105 is arranged to receive the information regarding the MS's support for the "ePTCCH principle" via an access burst from the MS, i.e. the access burst from the MS is received in the BTS of the BSS, from where the information in the access burst is transmitted to the BTS. In one such embodiment, the BSC 105 is arranged to receive the information regarding the MS's support for the "ePTCCH principle" as a code point in the EGPRS packet Channel Request. In another such embodiment, the BSC 105 is arranged to receive the information regarding the MS's support for the "ePTCCH principle" in a training sequence when the MS transmits an access request message.

In one embodiment, the BSC 105 is arranged to receive the information regarding the MS's support for the "ePTCCH principle" from an SGSN in the GSM/EDGE network 100. In such a case, the information can be included in the MS Radio Access Capability Information Element (MS RAC IE) that is stored in the SGSN and is sent along with payload to the BSC. Hence, when a TBF (Temporary Block Flow) setup is initiated by data reception from the SGSN, the BSC 105 will be made aware of the MS's ePTCCH capability from the MS RAC IE.

Figure 6:
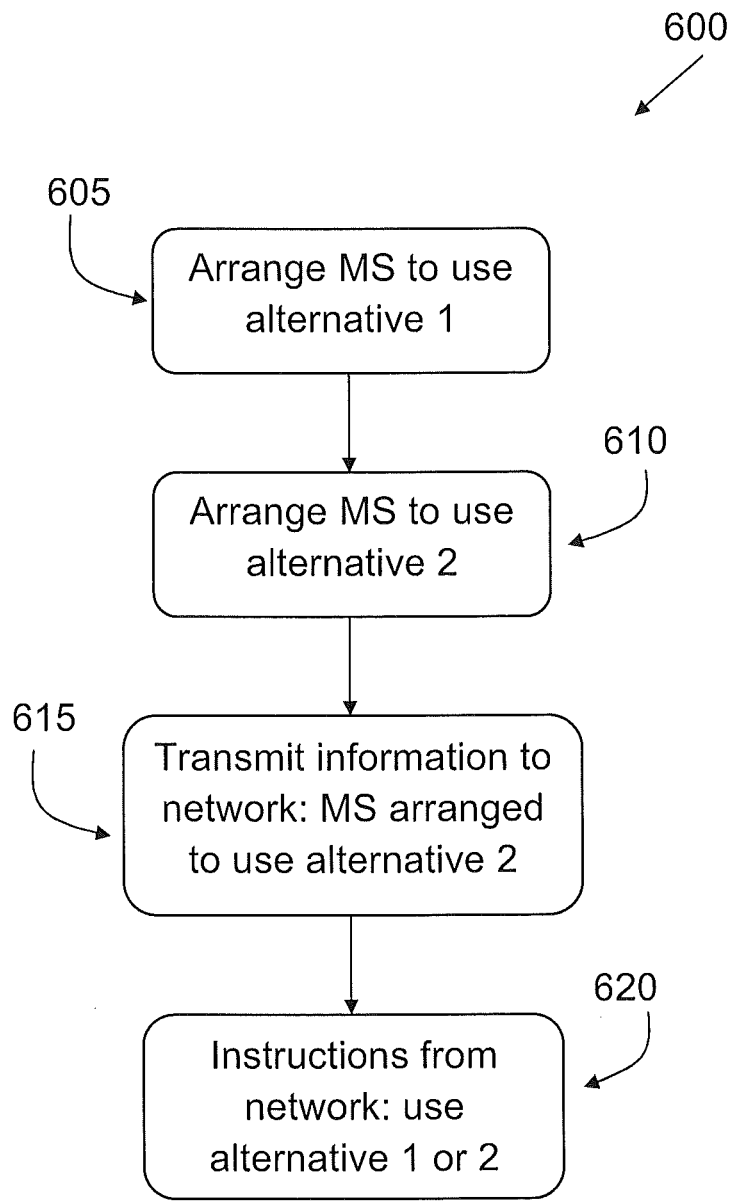
FIGS. 6 and 7 show flow charts of methods.

FIG. 6 shows a flow chart of a method 600 for operating a Mobile Station, an MS, in a GSM/EDGE network.

As shown in step 605, the method comprises arranging the MS to use, as a first alternative, every $13^{th}$ TDMA frame with an odd number for neighboring cell measurements and every $13^{th}$ TDMA frame with an even number as a PTCCH, a Packet Timing Control Channel, and, arranging the MS, to use, as a second alternative, every $13^{th}$ TDMA frame with an odd number as a PTCCH and every $13^{th}$ TDMA frame with an even number for neighboring cell measurements.

As shown in step 615, the method 600 further comprises transmitting information to the GSM/EDGE network that the MS is able to use the second alternative, and, step 620, receiving instructions from the GSM/EDGE network to the MS to use either the first or the second alternative.

In one embodiment of the method 600, the information that the MS is able to use the second alternative is transmitted to the GSM/EDGE network in the Information Element MS Radio Access Capability.

In one embodiment of the method 600, the information that the MS is able to use the second alternative is transmitted to the GSM/EDGE network in an access burst, if the MS receives information in the system information that the second alternative is supported by the network. In one such embodiment, the information is transmitted to the network as a code point in the EGPRS packet Channel Request. In another such embodiment, the information is transmitted to the network as a training sequence which is used when transmitting an access request message.

Figure 7:
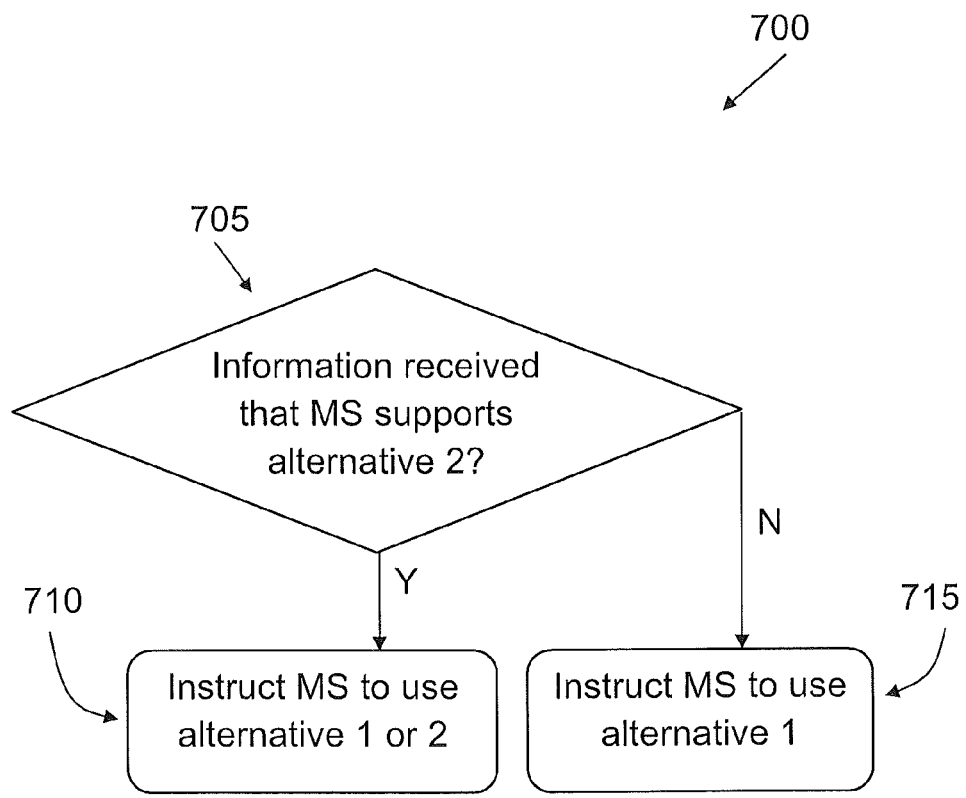

FIG. 7 shows a flow chart of a method 700 for operating a Base Station Controller, a BSC, in a GSM/EDGE network. The method comprises instructing an MS in the GSM/EDGE network to use every $13^{th}$ TDMA frame according to a first or a second alternative, depending on whether or not the BSC has received information that the MS supports the second alternative. Thus, as shown in step 705, the BSC checks if it has received information that the MS supports the second alternative. If this is not the case, as shown in step 715, the BSC instructs the MS to use the first alternative, while, as shown in step 710, if the BSC receives information that the MS supports the second alternative, the BSC instructs the MS to use the first or the second alternative.

The first alternative comprises using every 13$^{th}$ TDMA frame with an odd number for neighboring cell measurements and every 13$^{th}$ TDMA frame with an even number as a PTCCH, a Packet Timing Control Channel, and the second alternative comprises using every 13$^{th}$ TDMA frame with an odd number as a PTCCH and every 13$^{th}$ TDMA frame with an even number for neighboring cell measurements.

In one embodiment, the information regarding the MS's support for the second alternative is received in the Information Element MS Radio Access Capability from the MS.

In one embodiment, the information regarding the MS's support for the second alternative is received via an access burst, as explained previously in this text. In one such embodiment, the information regarding the MS's support the said second alternative is received as a code point in the EGPRS packet Channel Request, as an alternative or complement to which the information regarding the MS's support for the second alternative is received in a training sequence when the MS transmits an access request message.

As has emerged from the description above of the BSC and the method for operating it, the BSC is arranged to instruct some MSs in a cell to use the "legacy PTCCH" and to instruct other MSs in the same cell to use the ePTCCH-method. It is only "modern" MSs, i.e. MSs capable of ePTCCH that can be instructed in this way, "legacy" MSs will always use the PTCCH method. How the BSC chooses which of the "modern" MSs that should use which method can be described as being dependent on the percentage of "modern" vs. "legacy" MSs in a cell: as long as the percentage of "modern" MSs is small in a cell, the "modern" MSs can be instructed to use ePTCCH. If the percentage of "modern" MSs exceeds a certain threshold, the BSC can instruct "modern" MSs to use ePTCCH when all of the "legacy" PTCCHs are used.

A Base Transceiver Station, a BTS, for a GSM/EDGE network will now be described with reference to the block diagram of such a BTS 110 shown in FIG. 8. It can be noted that on the "block level", a BTS exhibits a certain degree of similarity both to a BSC and to an MS.

The BTS 110 comprises an antenna unit 812, by means of which it handles transmissions to and reception from other units in the GSM/EDGE network, such as the MSs in a cell and possibly also the BSC, although communication with the BSC can also be by means of a landline. The BTS 110 also comprises an I/O unit 822 for formatting incoming and/or outgoing transmissions, whether they are communicated by landline or wirelessly via the antenna unit 822.

The BTS 110 also comprises a transmit unit Tx 826, as well as a receive unit Rx 823, both of which are connected to the I/O-unit 822. The function of the BTS 110 is mainly controlled by a control unit 824, which is connected to both the receive unit 823 and the transmit unit 826. In addition, the BTS 110 comprises a memory unit 825, which is also connected to the control unit 824.

Figure 8:
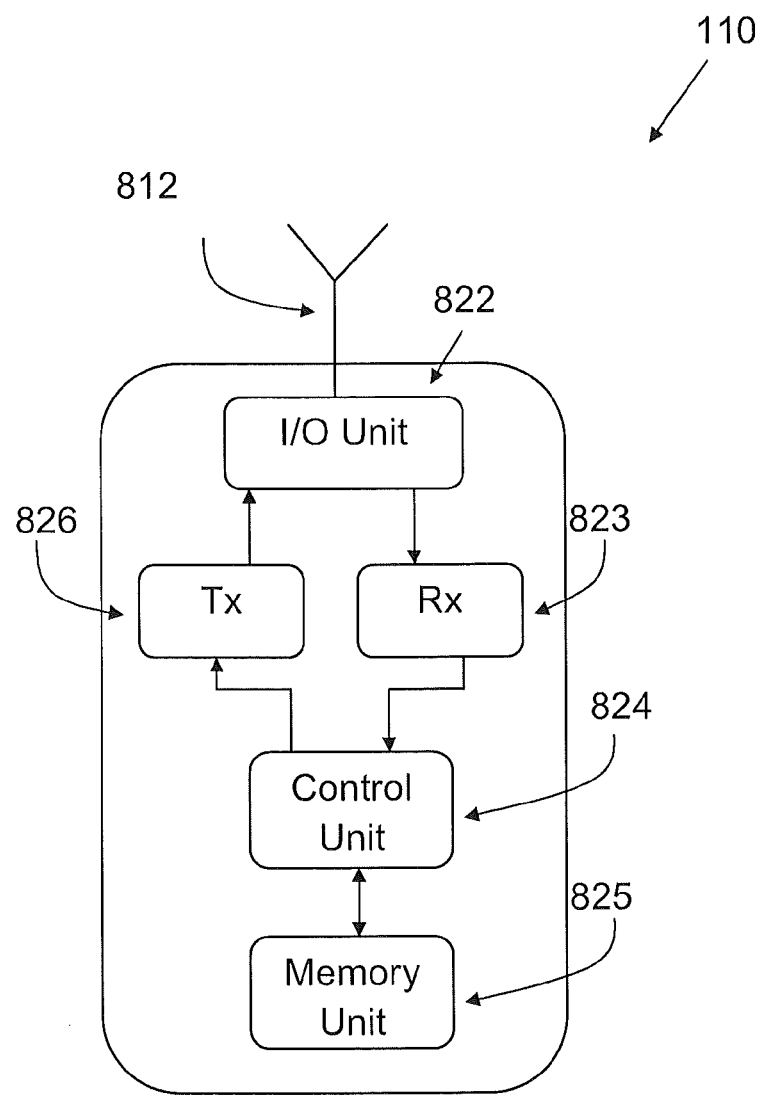
FIG. 8 shows a block diagram of a BTS.

It should be pointed out that the I/O-unit can also be integrated into the transmit and receive units 826, 823, in which case it is not a separate unit as shown in FIG. 8.

The BTS 110 is arranged to detect one or more access bursts from one or more Mobile Stations, MSs, in a cell in the GSN/EDGE network, for which purpose the BTS 110 uses the antenna unit 812, the I/O-unit 822 and the receive unit 823 and the control unit 824. In addition, the BTS 110 is arranged to determine a Timing Advance, TA, value for each of said one or more MSs based on said burst or bursts, for which purpose the BTS 110 uses the control unit 824. It should be pointed out that what is meant here is that the TA value for a certain MS is based on the burst or bursts which are detected from that particular MS.

The BTS 110 is also arranged to transmit an MS's determined TA value to the MS, which is done using the antenna unit 812, the I/O-unit 822 and the transmit unit 826, as controlled by the control unit 824.

Furthermore, the BTS is arranged to carry out the detection of bursts and transmission of TA values for an MS in a TDMA frame which that MS uses for the PTCCH channel.

As a first alternative, this TDMA frame is taken from among every 13th TDMA frame with an even number, and as a second alternative, this TDMA frame is taken from among every 13th TDMA frame with an even number.

The choice of which of the first and second alternatives that should be used by the BTS 110 is suitably received as an instruction from a Base Station Controller, BSC, in the GSM/EDGE network. Such an instruction is then received by means of the antenna unit 812 and/or the I/O unit 822, and the receive unit 823, and "interpreted" by the control unit 824.

In embodiments, the BTS 110 is arranged to receive information from an MS that the MS is capable of the second alternative, which is done by means of the antenna unit 812, the I/O-unit 822, the receive unit 823 and the control unit 824, and to transmit this information to the BSC, by means of the antenna unit 812, the I/O-unit 822, the transmit unit 826, as controlled by the control unit 824.

In embodiments, the BTS 110 is arranged to receive the information from the MS in the Information Element MS Radio Access Capability, with the information being received by means of the antenna unit 812, the I/O-unit 822 and the receive unit 823.

In embodiments, the BTS 110 is arranged to receive the information from the MS in an access burst, with the information being received by means of the antenna unit 812, the I/O-unit 822 and the receive unit 823.

In embodiments, the BTS 110 is arranged to receive the information from the MS as a code point in the EGPRS packet Channel Request, with the information being received by means of the antenna unit 812, the I/O-unit 822 and the receive unit 823.

In embodiments, the BTS 110 is arranged to receive the information from the MS as a training sequence in connection with an access request message from the MS, with the information being received by means of the antenna unit 812, the I/O-unit 822 and the receive unit 823.

Figure 9:
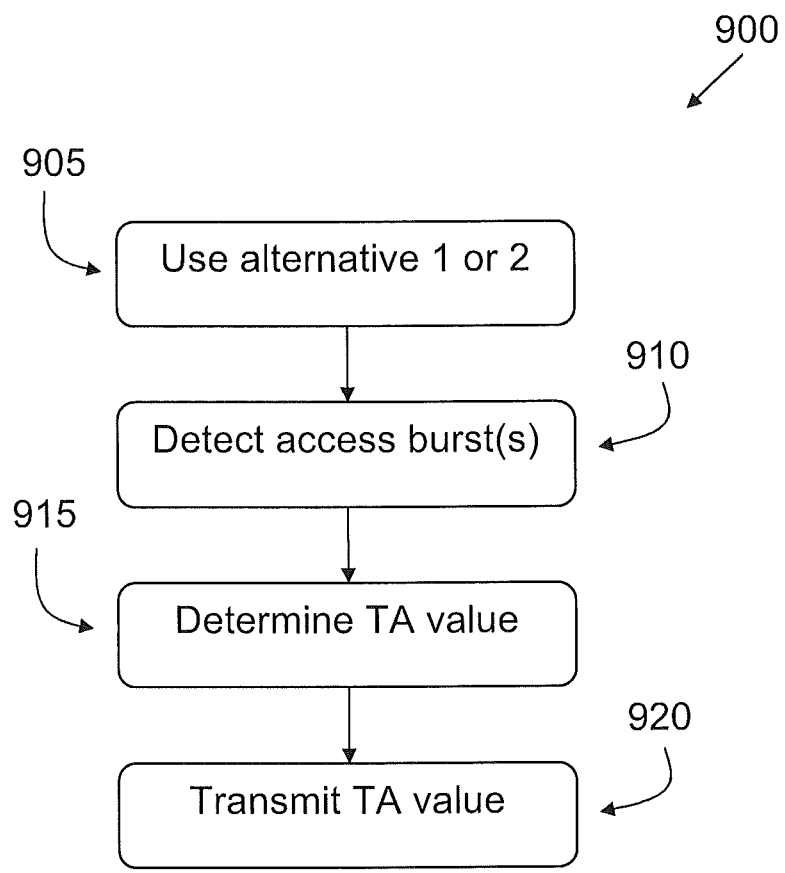
FIG. 9 shows a flow chart of a method.

FIG. 9 shows a flow chart of a method 900 for operating a Base Transceiver Station, a BTS, such as the one 110 in a GSM/EDGE network such as the one 100.

As shown in step 910, the method 900 comprises detecting one or more access burst(s) from one or more Mobile Stations, MSs, in a cell in the GSN/EDGE network, and determining, step 915, a Timing Advance, TA, value for each of said one or more MSs based on said one or more burst(s).

As shown in step 920, the method 900 further comprises transmitting an MS's determined TA value to the MS.

According to, the method 900, the detection of access burst(s) from an MS and the transmissions to an MS are carried out in a TDMA frame which the MS uses for the PTCCH channel, and the TDMA frame is either taken, as a first alternative, from among every 13th TDMA frame with an even number or, as a second alternative, from among every 13th TDMA frame with an odd number. This choice of alternatives is show in step 905.

In embodiments, the method 900 comprises receiving an instruction from a Base Station Controller, BSC, in the GSM/EDGE network, regarding whether the first or second alternative should be used for an MS.

In embodiments, the method 900 comprises receiving information from an MS that the MS is capable of the second alternative, and transmitting this information to the BSC.

In embodiments, the method 900 comprises receiving the information from the MS in the Information Element MS Radio Access Capability.

In embodiments, the method 900 comprises receiving the information from the MS in an access burst.

In embodiments, the method 900 comprises receiving the information from the MS in the EGPRS packet Channel Request.

In embodiments, the method 900 comprises receiving the information from the MS as a training sequence in connection with an access request message from the MS.

The terminology used herein is for the purpose of describing particular embodiments only, and is not intended to limit the invention.

Embodiments of the invention are described with reference to the drawings, such as block diagrams and/or flowcharts. In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention claimed is:

1. A Mobile Station, MS, for a GSM/EDGE network, the MS comprising:
a transceiver that handles transmission to and reception from the GSM/EDGE network; and
a controller coupled to the transceiver, wherein the controller is,
arranged to transmit information through the transceiver to the GSM/EDGE network that the MS is able to use every $13^{th}$ TDMA frame with an odd number as a PTCCH and every $13^{th}$ TDMA frame with an even number for neighboring cell measurements,
arranged to receive first instructions from the GSM/EDGE network through the transceiver for the Mobile Station to use every $13^{th}$ TDMA frame with an odd number as a PTCCH and every $13^{th}$ TDMA frame with an even number for neighboring cell measurements,
arranged to use every $13^{th}$ TDMA frame with an odd number as a PTCCH and every $13^{th}$ TDMA frame with an even number for neighboring cell measurements responsive to the first instructions,
arranged to receive second instructions from the GSM/EDGE network through the transceiver for the Mobile Station to use every $13^{th}$ TDMA frame with an odd number as an idle frame for neighboring cell measurements and every $13^{th}$ TDMA frame with an even number as a PTCCH, after receiving the first instructions, and
arranging to use every $13^{th}$ TDMA frame with an odd number as an idle frame for neighboring cell measurements and every $13^{th}$ TDMA frame with an even number as a PTCCH responsive to the second instructions.

2. The MS of claim 1, wherein the controller is further arranged to transmit said information through the transceiver to the network in the Information Element MS Radio Access Capability.

3. The MS of claim 1, wherein the controller is further arranged to transmit said information to the network in an access burst, responsive to receiving information from the network through the transceiver in system information that the network supports using every $13^{th}$ TDMA frame with an even number as an idle frame for neighboring cell measurements and every $13^{th}$ TDMA frame with an odd number as a PTCCH, after receiving the first instructions.

4. The MS of claim 3, wherein the controller is further arranged to transmit said information through the transceiver to the network as a code point in a EGPRS packet Channel Request.

5. The MS of claim 3, wherein the controller is further arranged to transmit said information through the transceiver to the network as a training sequence to be used when transmitting an access request message.

6. A Base Station Controller, a BSC, for a GSM/EDGE network, the BSC comprising:
a transceiver that handles transmission and reception in the GSM/EDGE network; and
a controller coupled to the transceiver, wherein the controller is,
arranged to receive information through the transceiver that a mobile station MS supports using every $13^{th}$ TDMA frame with an odd number as a PTCCH and every $13^{th}$ TDMA frame with an even number for neighboring cell measurements,
arranged to transmit instructions through the transceiver to the MS to use every $13^{th}$ TDMA frame with an odd number as a PTCCH and every $13^{th}$ TDMA frame with an even number for neighboring cell measurements responsive to receiving the information, and
arranged to use every $13^{th}$ TDMA frame with an odd number as a PTCCH for the mobile station after transmitting the instructions to the mobile station.

7. The BSC of claim 6, wherein the controller is further arranged to receive the information in an Information Element MS Radio Access Capability from the MS.

8. The BSC of claim 6, wherein the controller is further arranged to receive the information via an access burst.

9. The BSC of claim 8, wherein the controller is further arranged to receive the information as a code point in the EGPRS packet Channel Request.

10. The BSC of claim 6, wherein the controller is further arranged to receive the information via a training sequence when the MS transmits an access request message.

11. The BSC of claim 6, wherein the controller is further arranged to receive the information from an SGSN in the GSM/EDGE network.

12. The Base Station Controller according to claim 6, wherein the mobile station is a first mobile station, wherein the controller is further arranged to,
instruct a second mobile station to use every $13^{th}$ TDMA frame with an even number as a PTCCH and every $13^{th}$ TDMA frame with an odd number for neighboring cell measurements, and use every 13$^{th}$ TDMA frame with an even number as a PTCCH for the second mobile station after instructing the second mobile station.

13. The Base Station Controller according to claim 12 wherein the controller is further arranged to,
transmit instructions through the transceiver to the first mobile station to use every 13$^{th}$ TDMA frame with an even number as a PTCCH and every 13$^{th}$ TDMA frame with an odd number for neighboring cell measurements; and
use every 13$^{th}$ TDMA frame with an even number as a PTCCH for the second mobile station after instructing the second mobile station to use every 13$^{th}$ TDMA frame with an even number as a PTCCH and every 13$^{th}$ TDMA frame with an odd number for neighboring cell measurements.

14. A method for operating a Mobile Station, an MS, in a GSM/EDGE network, the method comprising:
transmitting information to the GSM/EDGE network that the MS is able to use every 13$^{th}$ TDMA frame with an odd number as a PTCCH and every 13$^{th}$ TDMA frame with an even number for neighboring cell measurements;
receiving first instructions from the GSM/EDGE network for the Mobile Station to use every 13$^{th}$ TDMA frame with an odd number as a PTCCH and every 13$^{th}$ TDMA frame with an even number for neighboring cell measurements;
responsive to the first instructions, arranging the Mobile Station to use every 13$^{th}$ TDMA frame with an odd number as a PTCCH and every 13$^{th}$ TDMA frame with an even number for neighboring cell measurements;
after receiving the first instructions, receiving second instructions from the GSM/EDGE network for the Mobile Station to use every 13$^{th}$ TDMA frame with an odd number as an idle frame for neighboring cell measurements and every 13$^{th}$ TDMA frame with an even number as a PTCCH; and
responsive to the second instructions, arranging the Mobile Station to use every 13$^{th}$ TDMA frame with an odd number as an idle frame for neighboring cell measurements and every 13$^{th}$ TDMA frame with an even number as a PTCCH.

15. The method of claim 14, wherein transmitting comprises transmitting said information to the GSM/EDGE network in an Information Element MS Radio Access Capability.

16. The method of claim 14, wherein transmitting comprises transmitting said information to the GSM/EDGE network in an access burst, responsive to receiving information in system information from the GSM/EDGE network that the network supports using every 13$^{th}$ TDMA frame with an even number as an idle frame for neighboring cell measurements and every 13$^{th}$ TDMA frame with an odd number as a PTCCH.

17. The method of claim 14, wherein transmitting comprises transmitting said information to the network as a code point in a EGPRS packet Channel Request.

18. The method of claim 14, wherein transmitting comprises transmitting said information to the network as a training sequence which is used when transmitting an access request message.

19. A method for operating a Base Station Controller, a BSC, in a GSM/EDGE network, the method comprising:
receiving information that a mobile station MS in the GSM/EDGE network supports using every 13$^{th}$ TDMA frame with an odd number as a PTCCH and every 13$^{th}$ TDMA frame with an even number for neighboring cell measurements;
responsive to receiving the information, instructing the mobile station in the GSM/EDGE network to use every 13$^{th}$ TDMA frame with an odd number as a PTCCH and every 13$^{th}$ TDMA frame with an even number for neighboring cell measurements; and
after instructing the mobile station, using every 13$^{th}$ TDMA frame with an odd number as a PTCCH for the mobile station.

20. The method of claim 19, wherein the information is received in the Information Element MS Radio Access Capability from the MS.

21. The method of claim 19, wherein the information is received via an access burst.

22. The method of claim 19, wherein the information is received as a code point in the EGPRS packet Channel Request.

23. The method of claim 19, wherein the information is received via a training sequence when the MS transmits an access request message.

24. The method according to claim 19, wherein the mobile station is a first mobile station, the method further comprising:
instructing a second mobile station to use every 13$^{th}$ TDMA frame with an even number as a PTCCH and every 13$^{th}$ TDMA frame with an odd number for neighboring cell measurements; and
after instructing the second mobile station, using every 13$^{th}$ TDMA frame with an even number as a PTCCH for the second mobile station.

25. The method according to claim 24 further comprising:
instructing the first mobile station to use every 13$^{th}$ TDMA frame with an even number as a PTCCH and every 13$^{th}$ TDMA frame with an odd number for neighboring cell measurements; and
after instructing the second mobile station to use every 13$^{th}$ TDMA frame with an even number as a PTCCH and every 13$^{th}$ TDMA frame with an odd number for neighboring cell measurements, using every 13$^{th}$ TDMA frame with an even number as a PTCCH for the second mobile station.

26. A Base Transceiver Station, BTS, for a GSM/EDGE network, the BTS comprising:
a transceiver that handles transmission and reception; and
a controller coupled to the transceiver, wherein the controller is,
arranged to detect one or more access bursts from a mobile station in a cell in the GSN/EDGE network,
arranged to determine a first Timing Advance, TA, value for the mobile station based on said burst or bursts,
arranged to transmit the first Timing Advance value to the MS, wherein said detection and transmission of the first Timing Advance value for the mobile station is carried out in a TDMA frame which the MS uses for a PTCCH channel, with said TDMA frame being taken from among every 13th TDMA frame with an odd number,
arranged to determine a second Timing Advance, TA, value for the mobile station based on said burst or bursts, and
arranged to transmit the second Timing Advance value to the MS, wherein said detection and transmission of the second Timing Advance value for the mobile station is carried out in a TDMA frame which the MS uses for a PTCCH channel, with said TDMA frame being taken from among every 13th TDMA frame with an even number.

27. The BTS of claim 26, wherein the controller is further, arranged to receive a first instruction for the mobile station from a Base Station Controller, BSC, in the GSM/EDGE network, for the mobile station to use every $13^{th}$ TDMA frame with an odd number for the PTTCH channel wherein said detecting and transmitting the first Timing Advance value for the mobile station is responsive to the first instruction, and arranged to receive a second instruction for the mobile station from the Base Station Controller, BSC, in the GSM/EDGE network, for the mobile station to use every $13^{th}$ TDMA frame with an even number for the PTTCH channel wherein said detecting and transmitting the second Timing Advance value for the mobile station is responsive to the second instruction.

28. The BTS of claim 27, wherein the controller is further arranged to receive information from the mobile station, MS, through the transceiver that the MS is capable of using every 13th TDMA frame with an odd number as a PTCCH channel, and to transmit the information to the BSC.

29. The BTS of claim 28, wherein the controller is further arranged to receive said information from the MS in an Information Element MS Radio Access Capability.

30. The BTS of claim 28, wherein the controller is further arranged to receive said information from the MS in an access burst.

31. The BTS of claim 30, wherein the controller is further arranged to receive said information from the MS as a code point in an EGPRS packet Channel Request.

32. The BTS of claim 30, wherein the controller is further arranged to receive said information from the MS as a training sequence in connection with an access request message from the MS.

33. A method for operating a Base Transceiver Station, BTS, in a GSM/EDGE network, the method comprising:
    detecting one or more access bursts from a Mobile Station, MS, in a cell in the GSN/EDGE network;
    determining a first Timing Advance, TA, value for the mobile station based on said one or more access bursts;
    transmitting the first Timing Advance TA value to the MS, wherein said detecting and transmitting the first Timing Advance value for the mobile station is carried out in a TDMA frame which the MS uses for a PTCCH channel, with said TDMA frame being taken from among every 13th TDMA frame with an odd number;
    determining a second Timing Advance, TA, value for the mobile station based on said one or more access bursts; and
    transmitting the second Timing Advance TA value to the MS, wherein said detecting and transmitting the second Timing Advance value for the mobile station is carried out in a TDMA frame which the MS uses for the PTCCH channel, with said TDMA frame being taken from among every 13th TDMA frame with an even number.

34. The method of claim 33, further comprising:
    receiving a first instruction for the mobile station from a Base Station Controller, BSC, in the GSM/EDGE network, for the mobile station to use every $13^{th}$ TDMA frame with an odd number for the PTTCH channel wherein said detecting and transmitting the first Timing Advance value for the mobile station is responsive to the first instruction; and
    receiving a second instruction for the mobile station from the Base Station Controller, BSC, in the GSM/EDGE network, for the mobile station to use every $13^{th}$ TDMA frame with an even number for the PTTCH channel wherein said detecting and transmitting the second Timing Advance value for the mobile station is responsive to the second instruction.

35. The method of claim 34, further comprising:
    receiving information from the mobile station, MS, that the MS is capable of using every 13th TDMA frame with an odd number as a PTCCH channel; and
    transmitting the information to the BSC.

36. The method of claim 35, further comprising:
    receiving said information from the MS in an Information Element MS Radio Access Capability.

37. The method of claim 35, further comprising:
    receiving said information from the MS in an access burst.

38. The method of claim 35, further comprising:
    receiving said information from the MS in an EGPRS packet Channel Request.

39. The method of claim 35, further comprising:
    receiving said information from the MS as a training sequence in connection with an access request message from the MS.

* * * * *